United States Patent
Flockhart et al.

[11] Patent Number: 5,905,793
[45] Date of Patent: May 18, 1999

[54] WAITING-CALL SELECTION BASED ON ANTICIPATED WAIT TIMES

[75] Inventors: Andrew D. Flockhart, Thornton, Colo.; Robin Harris Foster, Little Silver, N.J.; Joylee E. Kohler, Northglenn, Colo.; Eugene P. Mathews, Barrington, Ill.

[73] Assignee: Lucent Technologies Inc., Murray Hill, N.J.

[21] Appl. No.: 08/813,513

[22] Filed: Mar. 7, 1997

[51] Int. Cl.[6] .................................................. H04M 3/00
[52] U.S. Cl. ........................ 379/266; 379/309; 379/265
[58] Field of Search .................................... 379/265, 266, 379/309, 207

[56] References Cited

U.S. PATENT DOCUMENTS

| | | |
|---|---|---|
| 3,969,589 | 7/1976 | Meise, Jr. et al. . |
| 4,048,452 | 9/1977 | Oehring et al. ........................ 179/27 D |
| 4,788,715 | 11/1988 | Lee ............................................ 379/84 |
| 4,881,261 | 11/1989 | Oliphant et al. ........................ 379/215 |
| 5,025,468 | 6/1991 | Sikand et al. ............................. 379/67 |
| 5,506,898 | 4/1996 | Costantini et al. ...................... 379/266 |
| 5,530,744 | 6/1996 | Charalambous et al. ............... 379/265 |
| 5,642,411 | 6/1997 | Theis ....................................... 379/266 |

OTHER PUBLICATIONS

Performance Modelling of Automatic Call Distributors: Assignable Grade of Service Staffing from International Switching Symposium 1992 (XIV)–Yokohama, Japan–Oct. 25–30, 1992, vol. 2, under "Diversification and Integration of Networks and Switching Technologies Towards the 21st Century".

Primary Examiner—Creighton Smith
Attorney, Agent, or Firm—David Volejnicek

[57] ABSTRACT

The maximum wait time for callers in a call center (FIG. 10) is lowered by selecting, for an agent (25) who has just become available to handle a call, a highest-priority waiting call that would most likely wait the longest if it were not selected at this time. Anticipated wait times are computed for the calls at the heads of the non-empty highest-priority call queues that correspond to the agent's skills or splits (202–210). The anticipated wait time of a call is computed as the call's present (elapsed) wait time plus the average rate of advance of calls in the call's queue (210). The call with the longest anticipated wait time is then selected first and is assigned to the available agent for handling (212–216). The process is repeated each time that any agent becomes available.

18 Claims, 1 Drawing Sheet

WAITING-CALL SELECTION BASED ON ANTICIPATED WAIT TIMES

TECHNICAL FIELD

This invention relates to queuing arrangements, for example to telephone call-answering centers and automatic call-distribution systems.

BACKGROUND OF THE INVENTION

In automatic call-distribution (ACD) systems, calls incoming to a call center are answered and handled by a plurality of agents. The ACD system automatically distributes and connects incoming calls to whatever agents are suited to handle the calls and are free, that is, not handling other calls at the moment.

It often happens that the call center becomes overloaded by calls, so that no suitable agents are available to handle calls at the moment that the calls come in. The calls then back up. They are placed in different queues based upon some preestablished criteria, and are placed in each queue in the order of their arrival and/or priority. There they await suitable agents becoming free and available to service them. The waiting calls are distributed to agents for handling on an oldest-call-waiting (OCW) basis. That is, when an agent becomes available, the system considers the call at the head of each queue from which that agent is eligible to handle a call, and selects the one of the calls that has been waiting the longest. The system does not consider how long a call will have to wait for the next available agent if the call is not selected at this time.

SUMMARY OF THE INVENTION

The inventors have realized that the additional wait time of each call that is not presently selected represents a cost, expressed for example in caller frustration and call abandonment, to the ACD system's client (the called party). They have further realized that they can lower the overall average speed of call answer, and thereby lower the above-mentioned cost, by selecting, for the agent who has just become available, the call that would most likely wait the longest if it were not selected at this time. For example, if a call queue corresponding to a main, large, skill possessed by many agents has a present elapsed wait time of one minute and a call rate of advance time of 10 seconds, the total anticipated wait time is 70 seconds for the oldest call in that queue. If a call queue corresponding to a specialized, small, skill possessed by few agents has a present elapsed wait time of 50 seconds and a call rate of advance of 25 seconds (since only a few agents have the skill), the total anticipated wait time is 75 seconds for the oldest call in that queue. According to the invention, a call from the queue corresponding to the specialized skill would be selected for an available agent who has both skills, even though the presently-oldest waiting call is in the queue corresponding to the main skill. Such call distribution not only lowers the average overall speed of answer, it also provides improved service to call types that only a few agents can handle or that require a long talk time (i.e., that have a low call rate of advance).

Generally according to the invention, therefore, there is provided a method of and an apparatus for selecting one of a plurality of items (e.g., calls) that are waiting to be selected. The method comprises the steps of anticipating how long each one of the plurality of items that are waiting to be selected will have waited to be selected if said item is not selected first from among the waiting items, and first selecting the one of the waiting items that has a longest anticipated wait time. Preferably these steps are repeated until only one item of the plurality of items remains waiting to be selected. The apparatus effects the method steps. It preferably includes an effector—any entity that effects the corresponding step, unlike a means—for each method step. Further according to the invention, there is provided a computer-readable medium containing software which, when executed in a computer, causes the computer to perform the method steps.

If the plurality of waiting items are communications that are waiting to be processed (e.g., handled by agents), the method comprises the steps of anticipating how long each one of the plurality of communications that are waiting to be processed will have waited before being processed if said communication is not processed first from among the waiting communications, and first processing the one of the waiting communications that has a longest anticipated wait time. The apparatus and the executing software again effect the method steps.

These and other advantages and features of the invention will become more apparent from the following description of an illustrative embodiment of the invention taken together with the drawing.

DETAILED DESCRIPTION

Figure 1:
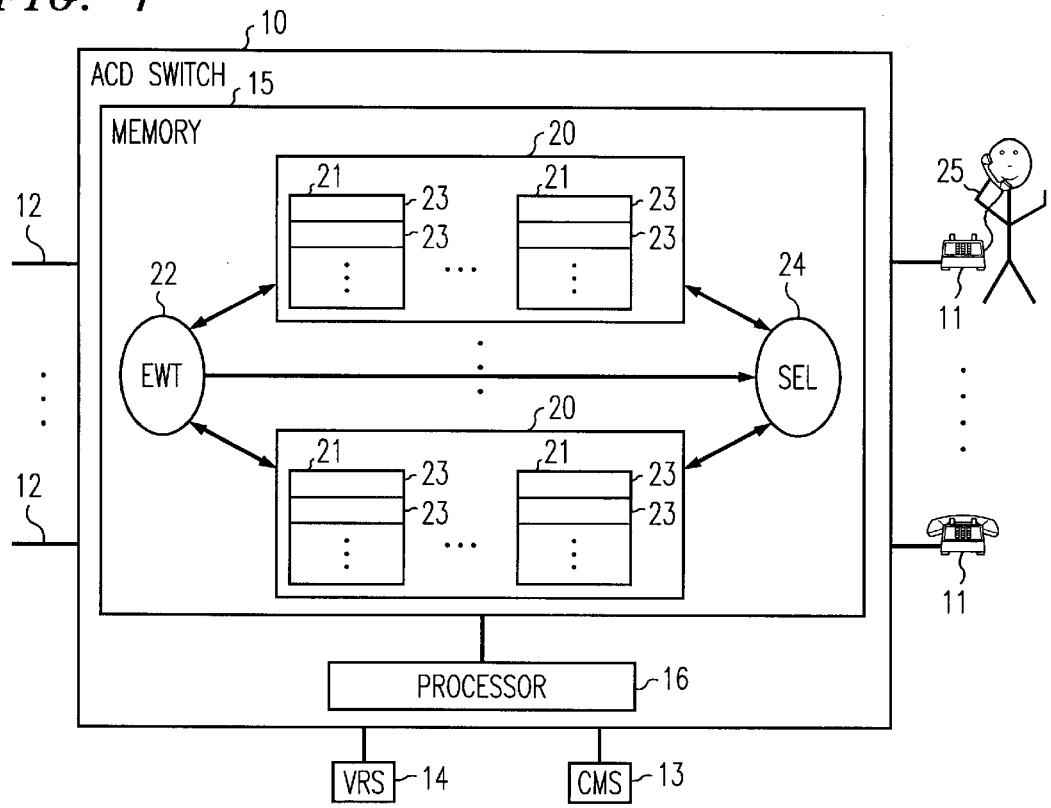
FIG. 1 is a block diagram of a call center that includes an illustrative embodiment of the invention.

FIG. 1 shows an illustrative call center that comprises an automatic call-distribution (ACD) switch 10 serving a plurality of agent stations 11 at least some of which are staffed by agents 25. ACD switch 10 is connected to a plurality of trunks 12 over which it receives incoming calls. It then distributes and connects these calls to stations 11 of available agents 25 based on a set of predetermined criteria. The agents process calls sent to them by ACD switch 10. The call center of FIG. 1 is illustratively the subscriber-premises equipment disclosed in U.S. Pat. No. 5,206,903, which is hereby incorporated herein by reference.

ACD switch 10 is also served by a pair of adjunct processors 13 and 14. Call management system (CMS) 13 provides a call accounting, reporting, and management capability, and a voice information system (VIS) 14 provides an announcements capability. Both adjunct processors 13 and 14 are conventional. CMS 13 is illustratively the Lucent Technologies CMS, and VIS 14 is illustratively the Lucent Technologies Conversant® VIS. As is conventional, ACD system 10 is a stored-program-controlled unit that includes a memory 15 comprising one or more different memory units for storing programs and data, and a processor 16 for executing the stored programs and using the stored data in their execution. The memory includes a plurality of sets 20 of call queues 21. Each set 20 of call queues 21 conventionally serves and holds calls for a different split or skill group of agents. Within each set 20 of call queues 21, each queue 21 holds calls of a different priority. Alternatively, each set 20 comprises only one call queue 21 in which calls of different priority are enqueued in their order of priority. Calls are assigned different priorities in a known manner based upon some predefined criteria such as, for example, whether the caller is an unknown person, a regular account holder, or a preferred customer. Each queue 21 functions as a first-in, first-out (FIFO) buffer memory, and includes a plurality of entries, or positions 23, each for identifying a corresponding one enqueued call. The position 23 at the head of queue 21 is considered to be position number 1, the next subsequent position 23 in queue 21 is considered to be position number 2, etc.

Memory 15 further includes an estimated wait time (EWT) function 22. As its name implies, this function determines an estimate of how long a call that is placed in a queue 21 will have to wait before being connected to a station 11 for servicing. The estimate is derived separately by EWT function 22 for each queue 21 of each set 20. It is based on the average rate of advance of calls through positions 23 of the calls' corresponding queue 21; this rate of advance is computed by EWT function 22. An illustrative implementation of EWT function 22 is disclosed in U.S. Pat. No. 5,506,898, which is hereby incorporated herein by reference.

Memory 15 further includes a call-selection (SEL) function 24. Function 24 is conventional in that, for each call at the head of a queue 21, it determines how long the call has been in the queue (the call's present wait time, or PWT), and in that, for each available agent 25, it selects a call from queues 21 for connection to and handling by that agent 25. According to the invention, however, SEL function 24 does not select calls on an oldest (highest PWT)-call-waiting basis. Rather, when an agent 25 becomes available, SEL function 24 considers the call at the head of each queue 21 from which that agent is eligible to handle a call, and selects the highest-priority one of the calls that would most likely wait the longest if it were not selected at this time. This functionality of SEL function 24 is flowcharted in FIG. 2.

Figure 2:
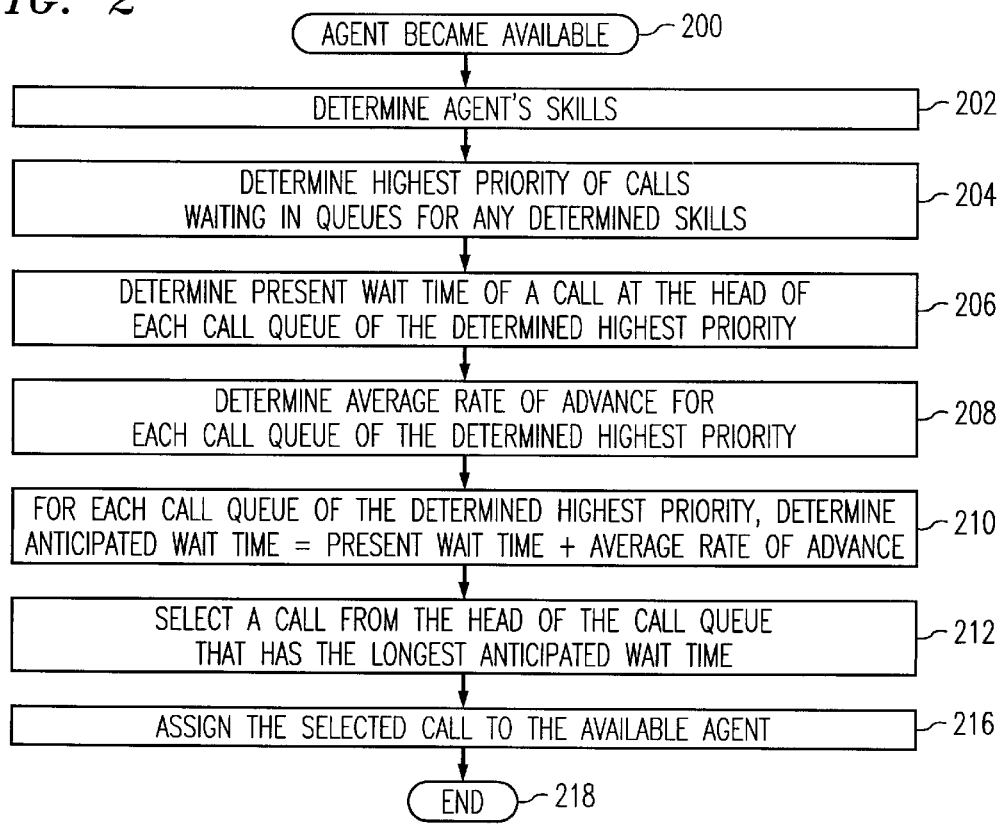
FIG. 2 is a flow diagram of operations of the SEL function of the call center of FIG. 1.

Execution of SEL function 24 is invoked each time that an agent 25 becomes available to handle a call, at step 200 of FIG. 2. In response, SEL function 24 determines, from the agent's stored profile, the skills to which agent 25 is assigned, at step 202. SEL function 24 then determines the highest priority of any calls that are waiting for any of the determined skills. Illustratively, for each of the agent's skills, SEL function 24 selects the corresponding set 20 of call queues 21 and determines the highest-priority call queue 21 in that set 20 which contains at least one call, and then determines the priority of the highest-priority one of the determined call queues 21. SEL function 22 then selects those determined call queues 21 which have the highest priority and computes the anticipated wait times for those selected queues 21, as follows.

For the call at the head of each of the determined highest-priority call queues 21, SEL function determines how long that call has been in queue (i.e., determines the call's present wait time), in a conventional manner, at step 206. For each of those calls, SEL function 24 also obtains from EWT function 22 the average rate of advance of calls in the corresponding call queue 21, at step 208. SEL function 24 further sums the two quantities obtained for each of the calls at steps 206 and 208 to compute each call's anticipated wait time, at step 210. Alternatively, the average rate of advance may be adjusted prior to summing, by subtracting therefrom one-half of the time since the last call was removed from the corresponding call queue and summing the result or 25% of the unadjusted average rate of advance—whichever is greater—with the present wait time. SEL function 24 then compares the computed anticipated wait times and selects the call that has the longest anticipated wait time, at step 212, and assigns the selected call to the agent 25 who became available at step 200, at step 216. SEL function 24 then ends execution, at step 218, until an agent 25 becomes available again.

Of course, various changes and modifications to the illustrative embodiment described above will be apparent to those skilled in the art. For example, when there are not enough calls to keep the agents busy and the agents queue up to wait for calls, the same algorithm can be used to determine which agent should take the next incoming call. Or, the SEL function may be performed by an adjunct processor that is connected to and controls the ACD switch via computer telephony integration (CTI). Also, application of the invention is not limited to distribution of real-time calls; it may also be applied to the queuing and distribution of stored requests sent or left by requestors, such as e-mail, voice mail, fax, video/voice recordings, and multimedia messages. The concept of AWT routing is also applicable to workflow applications that route work items among people or stations qualified to do the next piece of the overall work, and to shop-floor scheduling. Such changes and modifications can be made without departing from the spirit and the scope of the invention and without diminishing its attendant advantages. It is therefore intended that such changes and modifications be covered by the following claims.

The invention claimed is:

1. A method of selecting one of a plurality of items that are waiting to be selected, comprising the steps of:
   anticipating how long each one of the plurality of items that are waiting to be selected will have waited to be selected if said item is not selected first from among the waiting items; and
   first selecting the one of the waiting items that has a longest anticipated wait time.

2. The method of claim 1 further comprising the step of:
   repeating the steps of claim 1 until only one item of the plurality of items remains waiting to be selected.

3. The method of claim 1 wherein:
   the step of anticipating comprises the steps of
      determining how long each one of the plurality of items has been waiting to be selected,
      determining how long each one of the plurality of items is likely to wait to be selected if said item is not selected first, and
      for each one of the items, combining the determinations made for said item to obtain the anticipated wait time for said item.

4. The method of claim 1 for selecting one of a plurality of items from a plurality of queues each having at least one enqueued item, wherein:
   the step of anticipating comprises the step of
      anticipating how long each item that is enqueued at a head of any of the queues will have waited to be selected if said item is not selected first from among the items that are enqueued at the heads of the plurality of the queues.

5. The method of claim 4 further comprising the step of:
   repeating the steps of claim 4 until only one of the plurality of the queues has any items enqueued therein.

6. The method of claim 1 wherein:
   the plurality of items are waiting to be selected for processing, and
   the first-selected item is selected for being processed first from among the waiting items.

7. A method of selecting for processing one of a plurality of communications that are waiting to be processed, comprising the steps of:
   anticipating how long each one of the plurality of communications that are waiting to be processed will have waited before being processed if said communication is not processed first from among the waiting communications; and first processing the one of the waiting communications that has a longest anticipated wait time.

8. The method of claim 7 further comprising the step of:

repeating the steps of claim 7 until only one communication of the plurality of communications remains waiting to be processed.

9. The method of claim 7 wherein:

the step of anticipating comprises the steps of determining how long each one of the plurality of communications has been waiting to be processed, determining how long each one of the plurality of communications is likely to wait to be processed if said communication is not processed first from among the waiting communications, and for each one of the waiting communications, combining the determinations made for said communication to obtain the anticipated wait time for said communication.

10. The method of claim 7 for selecting for processing one of a plurality of communications from a plurality of queues each having at least one enqueued communication, wherein:

the step of anticipating comprises the step of anticipating how long each communication that is enqueued at a head of any of the queues will have waited to be processed if said communication is not processed first from among the communications that are enqueued at the heads of the plurality of the queues.

11. The method of claim 10 wherein:

the step of anticipating how long each communication that is enqueued at a head of any of the queues will have waited comprises the steps of determining how long each one of the plurality of the communications that are enqueued at the heads of the queues have been enqueued, determining how long each one of the plurality of the communications that are enqueued at the heads of the queues is likely to remain enqueued if said communication is not processed first, and for each one of the plurality of the communications that are enqueued at the heads of the queues, combining the determinations made for said communication to obtain the anticipated wait time for said communication.

12. The method of claim 11 wherein:

the step of determining how long each one of the plurality of the communications is likely to remain enqueued comprises the step of determining for each of the queues a rate of advance of enqueued communications through the queue.

13. The method of claim 11 further comprising the step of:

repeating the steps of claim 11 until only one of the plurality of the queues has any communications enqueued therein.

14. The method of claim 10 wherein:

each one of the queues corresponds to a different skill or split, and the step of anticipating comprises the steps of in response to an agent becoming available to process a communication, determining skills or splits that correspond to the agent;

in response to determining the skills or splits that correspond to the agent, anticipating how long each communication that is enqueued at a head of any of the queues that correspond to the skills or splits that correspond to the agent will have waited to be processed if said communication is not processed first from among the communications that are enqueued at the heads of the queues that correspond to the skills or splits that correspond to the agent.

15. An apparatus that effects the steps of claim, 1 or 2 or 3 or 4 or 5 or 6 or 7 or 8 or 9 or 10 or 11 or 12 or 13 or 14.

16. A computer-readable medium containing software which, when executed in a computer, causes the computer to perform the steps of claim 1 or 2 or 3 or 4 or 5 or 6 or 7 or 8 or 9 or 10 or 11 or 12 or 13 or 14.

17. An apparatus for selecting one of a plurality of items that are waiting to be selected, comprising:

means for anticipating how long each one of the plurality of items that are waiting to be selected will have waited to be selected if said item is not selected first from among the waiting items; and means cooperative with the anticipating means, for first selecting the one of the waiting items that has a longest anticipated wait time.

18. An apparatus for selecting one of a plurality of items that are waiting to be selected, comprising:

an effector of anticipating how long each one of the plurality of items that are waiting to be selected will have waited to be selected if said item is not selected first from among the waiting items; and an effector, cooperative with the effector of anticipating, of first selecting the one of the waiting items that has a longest anticipated wait time.

* * * * *